United States Patent [19]

Hayashi

[11] Patent Number: 4,509,610
[45] Date of Patent: Apr. 9, 1985

[54] WEIGHING DEVICE OF LOAD CELL TYPE

[75] Inventor: Junichi Hayashi, Akashi, Japan

[73] Assignee: Yamato Scale Company, Limited, Akashi, Japan

[21] Appl. No.: 435,113

[22] Filed: Oct. 19, 1982

[30] Foreign Application Priority Data

Oct. 28, 1981 [JP] Japan .................. 56-173411

[51] Int. Cl.³ .................. G01G 3/14; G01G 3/08; G01L 5/12
[52] U.S. Cl. .................. 177/211; 177/229; 73/862.65
[58] Field of Search .................. 177/211, 229; 73/862.65, 862.66

[56] References Cited

U.S. PATENT DOCUMENTS

| 2,859,613 | 11/1958 | Green | 73/862.65 |
| 3,837,416 | 9/1974 | Nozaki | 177/229 X |
| 4,170,270 | 10/1979 | Sette et al. | 177/229 X |
| 4,179,004 | 12/1979 | Ebbinge | 177/211 |
| 4,196,784 | 4/1980 | Suzuki et al. | 177/211 |
| 4,450,922 | 5/1984 | Alexandre | 177/211 |

Primary Examiner—George H. Miller, Jr.
Attorney, Agent, or Firm—Senniger, Powers, Leavitt and Roedel

[57] ABSTRACT

An improved weighing device of load cell type is proposed, wherein a cantilever type load cell and a parallelogrammatic Roberval's mechanism are combined through a connecting rod having a particular shape which results in greatly increased accuracy of measurement regardless of loading position on a weighing cradle or platform of the device.

4 Claims, 9 Drawing Figures

WEIGHING DEVICE OF LOAD CELL TYPE

This invention relates to a weighing device of the load cell type, having a weighing cradle or platform.

A modern weighing device having a weighing cradle includes generally a parallelogrammatic mechanism, one of its vertical members being fixed to a stationary bracket and the other being coupled to the weighing cradle. The four linking portions are elastically deformable and strain gauge elements are affixed thereto for sensing deformation corresponding to the weight of article on the cradle. In this parallelogrammatic mechanism, so-called "Roberval's mechanism", the measured value is not affected by the position of article on the cradle, as well known in the art. Moreover, such weighing device adopting a parallelogrammatic load cell is advantageous in that it is simple in structure, easy to manufacture, relatively high in sensitivity and low in manufacturing cost. However, this type of weighing device has suffered irregular measurement errors due to abnormal deformation of the parallelogrammatic member as decribed in detail in the opened Japanese patent specification No. 56-36030, which has also proposed a structural improvement for overcoming this problem. However, this latter type of weighing device has a disadvantage in that it is liable to be affected by surrounding conditions such as moisture and corrosive gases. While it has been proposed to provide a cover which air-tightly seals the whole of the parallelogrammatic load cell, this results in an unduly unwanted large size of device and is impractical. Another type of load cell, whose sensing section is completely sealed off from the surroundings, has been proposed. However, this type of load cell has no particular feature of the parallelogrammatic load cell as described above. Under these circumstances, it has been proposed to combine the latter type of load cell with the parallelogrammatic mechanism. An example of the proposed structure is disclosed in the opened Japanese utility model specification No. 54-30863. However, it is also insufficient for the reason described later.

Therefore, an object of this invention is to provide an improved structure of for a weighing device adopting the above-mentioned combination and completely overcoming the above-mentioned problems.

According to this invention, there is provided a weighing device of the load cell type including a parallelogrammatic mechanism having a pair of vertical members and a pair of horizontal members. One of the vertical members is fixed to a stationary bracket of the device and the other vertical member is coupled to a weighing cradle or platform. The four linking portions of the mechanism are formed as its elastically deformable parts. The device also includes a load cell having sensing elements completely sealed from the surroundings. The load cell is also fixed to the stationary bracket above or under the parallelogrammatic mechanism. As a feature of this invention, the other vertical member of the parallelogrammatic mechanism and the free end of the load cell are coupled through a connecting rod having a first flat portion which is parallel to the plane of the parallelogram and a second flat portion which is perpendicular to that plane.

The object and feature of this invention will be described in more detail hereinunder with reference to the accompanying drawings.

In the drawings.

Throughout the drawings, same reference numerals are giving to corresponding structural components.

Figure 1:
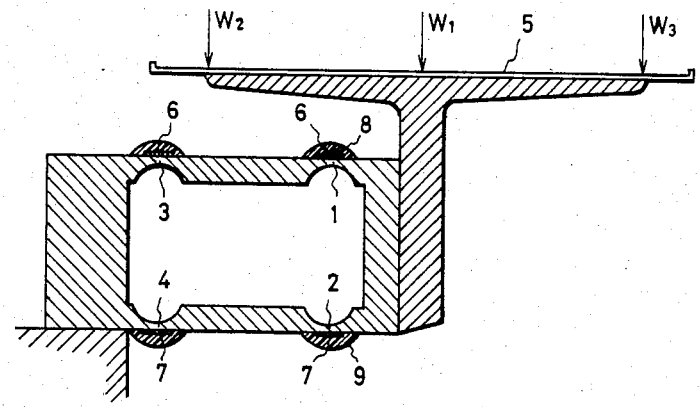
FIG. 1 is a sectional side view representing a prior art weighing device adopting a parallelogrammatic load cell.

FIG. 1 shows a conventional weighing device having a parallelogrammatic load cell. The load cell has four elastically deformable portions 1, 2, 3 and 4 which serve as linking portions of a Roberval mechanism and also as strain detecting sections. Strain sensing elements 6 and 7 of a strain gauge are affixed to the portions 1, 2, 3 and 4 and covered with coating materials 8 and 9 such as silicon rubber or synthetic resin. As shown in the drawing, one of the vertical members of the Roberval mechanism is fixed to a stationary bracket and the other vertical member is coupled to a weighing cradle or platform 5. As a particular feature of a Roberval mechanism, any of the weights $W_1$, $W_2$ and $W_3$ will result in the same deformation of the load, therefore, the same measured weight value when $W_1 = W_2 = W_3$.

However, coatings 8 and 9 of the strain gauge elements are not sufficient for preventing permeation of moisture and, when the sensing element is of the fine wire type, error may be caused by deterioration of electric insulation due to the permeating moisture. Moreover, the strain detecting sections 1, 2, 3 and 4 may be corroded or rusted by surrounding active gases and this may result in a change of the elastic constants and a corresponding error of measurement. It may be possible to overcome this problem due to surrounding conditions by providing the load cell with an air-tight cover as enclosure. However, such cover will make the device undesirably large and expensive.

Figure 2:
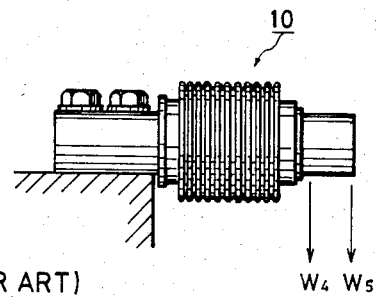
FIG. 2 is a side view representing a prior art metal sealed load cell.

FIG. 2 shows another type of load cell 10 according to the prior art, having its strain detecting section completely enclosed and air-tightly sealed with a metal bellows cover. Although this type of load cell can overcome the above problem due to surrounding conditions, it has no advantageous feature of Roberval's mechanism and exhibits different measurements with equal weights $W_4$ and $W_5$ due to difference in the length of cantilever.

Figure 3:
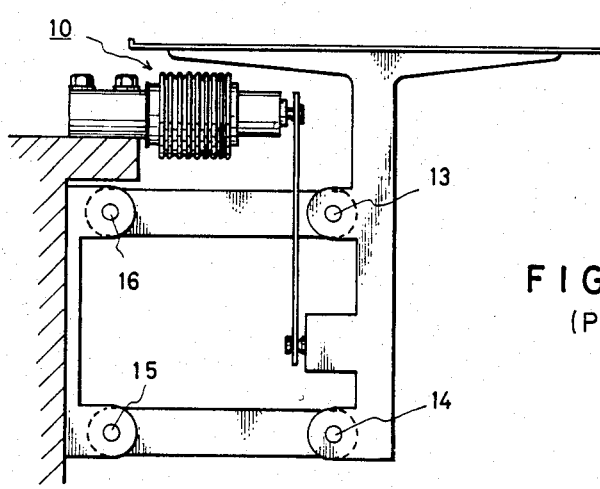
FIG. 3 is a side view representing an example of a prior art weighing device including a parallelogrammatic mechanism and a metal sealed load cell coupled with a pin.

FIG. 3 shows an improved prior art weighing device which includes the load cell 10 as shown in FIG. 2 combined with Roberval's mechanism. In this device, the abovementioned disadvantage of the load cell 10 can be overcome. However, it has been known that this type of weighing device may exhibit unwanted insensitive region and hysteresis characteristics due to friction at four pivots 13, 14, 15 and 16.

Figure 4:
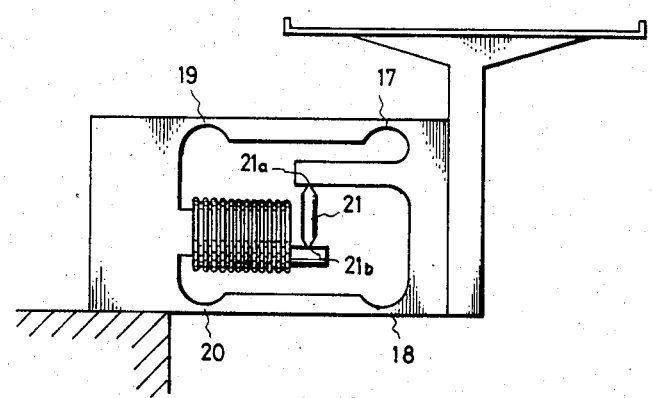
FIG. 4 is a side view representing an example of a prior art weighing device including a metal sealed load cell combined with an elastically deformable parallelogrammatic mechanism.

The inventor of the aforementioned opened Japanese utility model specification No. 54-30863 has proposed a novel structure as shown in FIG. 4. This structure is a combination of FIGS. 1 and 2 and includes four elastically deformable portions 17, 18, 19 and 20 in place of the pivots 13, 14, 15 and 16 of FIG. 3. The load cell and the parallelogrammatic mechanism are coupled through a compression rod 21 which is put in contact with the cell and mechanism at pivots 21a and 21b. This structure has overcome the problem of the structure of FIG. 3 but presented a further problem of unstable pivot contact of the pivots 21a and 21b, which reduces reproducibility of measurement. In order to avoid such unstable pivot contact, preliminary load is applied through the rod 21 to the load cell. However, this preliminary load results in unwanted reduction in the measurable range of the weighing device, since the latter is a difference between the rated load of the load cell and the preliminary load. Moreover, this type of structure has an essential disadvantage that no negative load can be measured due to separation of the pivots 21a and 21b, as will be readily understood.

Figure 5:
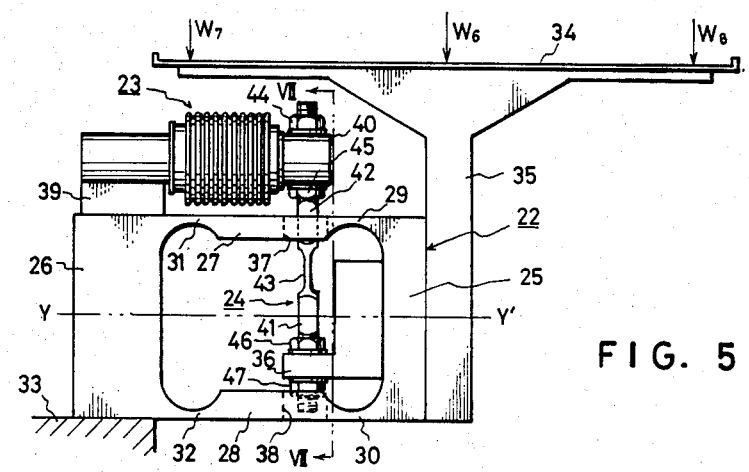
FIG. 5 is a side view representing an embodiment of this invention.

Now, the invention will be described hereinunder with reference to FIG. 5 showing an illustrative embodiment, wherein a parallelogrammatic mechanism 22 of the type of FIG. 1 and a metal-sealed load cell 23 of the type of FIG. 2 are coupled tightly through a connecting rod 24.

The parallelogrammatic mechanism 22 include first and second vertical members 25 and 26 and a pair of horizontal members designated 27 and 28 respectively which are coupled through four elastically deformable portions 29, 30, 31 and 32. The vertical member 25 is coupled rigidly to a weighing cradle 34 through a support rod 35 and the vertical member 26 is fixed to a stationary bracket 33 of the device, so that the vertical member 25 can move vertically together with the cradle 34. A bracket 36 extends from the inner face of the vertical member 25 and a vertical through-hole is formed therein for receiving the connecting rod 24. For passing the connecting rod 24, loose holes 37 and 38 are formed also in the horizontal members 27 and 28, respectively.

The metal sealed load cell 23 is fixed at its base end to an arm 39 extending upwards from the vertical member 26 and the other end extends to just above the hole 37 to form a cantilever structure disposed outside of the parallelogram formed by members 25, 26, 27 and 28. A vertical through-hole aligning with the holes 37 and 38, as well as the through-hole in the bracket 36, is formed also in the free end 40 of the load cell 23. No further description will be given about the internal and sealing structures of the load cell 23 since they are well known in the art.

Figure 6:
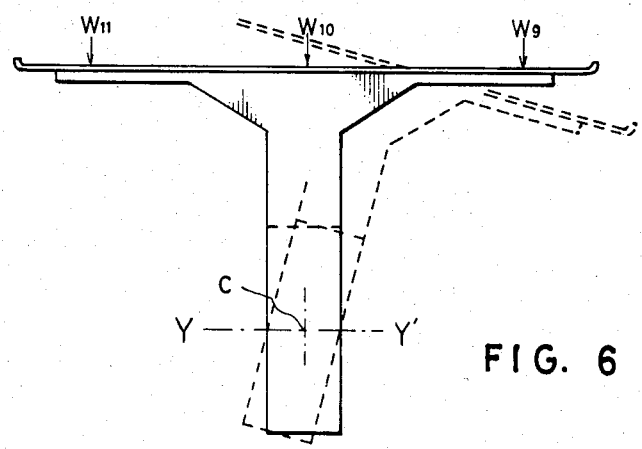
FIG. 6 is a partial front view of the embodiment of FIG. 5 presented for explaining its operation.

The connecting rod 24 has both its end portions formed as male screws, respectively, and its intermediate portion with a pair of first flat portions 41 and 42 and a single second flat portion 43 therebetween. The upper end of the connecting rod 24 passes the through-hole in the free end 40 of the load cell 23 and is rigidly detachably but fixed thereto with nuts 44 and 45, and the lower end thereof similarly passes the through-hole in the bracket 36 and is rigidly detachably but fixed thereto with nuts 46 and 47. In this fixed state, the flat surfaces of the first portions 41 and 42 are directed in parallel to the plane of the parallelogram, that is, the paper plane of FIG. 5, and the flat surface of the second portion 43 is directed normal to the above plane, that is, normal to axis Y—Y' in FIG. 5, which is the twisting axis of the parallelogrammatic mechanism. As shown in FIG. 6, the structure is twisted about the axis Y—Y' as shown by dotted lines when loads $W_9$, $W_{10}$ and $W_{11}$ are partially applied. As shown, the connecting rod 24 has no connection to either of the horizontal members 27 or 28.

Figure 7:
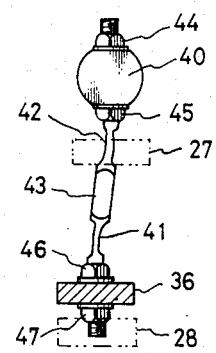
FIG. 7 is a partial sectional view taken along line VII—VII of FIG. 5 and presented for explaining the same.

The weighing device constructed as above can effect highly accurate measurement regardless of the position at which a load is applied on the weighing cradle 34. The reason for this is as follows. When a load is applied onto the weighing cradle 34, it acts on the load cell 23 through the vertical member 25 and the connecting rod 24. The load cell 23 and the parallelogrammatic mechanism 22 are deflected vertically with increase of the load, and the parallelogrammatic mechanism 22 may be twisted also in accordance with the loaded position. Assuming now that only load $W_9$ is applied onto the cradle as shown in FIG. 6, the structure is twisted about a point C in clockwise direction as exaggeratedly shown by dotted lines. This twist is transferred also to the connecting rod 24. If the twist is transferred to the load cell as it is, the load cell is subject to simultaneous application of twist and bending, which results in interference of forces other than in the principal direction, and accuracy of measurement becomes very low. However, resistance of the connecting rod 24 against bending resulting from the twist is very low, due to presence of the first flat portions 41 and 42. With the applied twist, the connecting rod 24 deforms as shown in FIG. 7 to avoid interference of the twist, thereby transferring the force only in the principal direction to the load cell 23.

Figure 8:
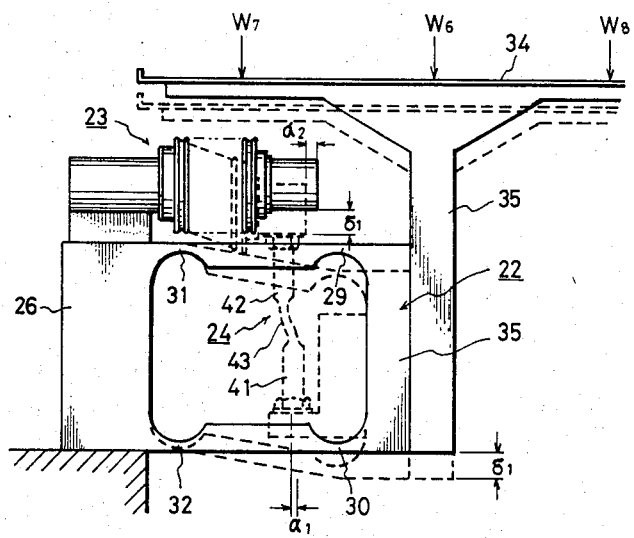
FIG. 8 is a side view presented for explaining operation of this embodiment.

Referring now to FIG. 8, description will be made of the case where the load applying position moves as shown by arrows $W_6$, $W_7$ and $W_8$. When a load is applied onto the weighing cradle 34 at the position $W_6$, the cradle 34 is pushed down. When the load is applied at the position $W_7$ or $W_8$, the cradle 34 is pushed down with inclination. The downward displacement is now assumed as $\delta_1$. This results in downward displacement $\delta_1$ of the bracket 36 and same downward displacement $\delta_1$ of the end portion 40 of the load cell 23 through the connecting rod 24. However, due to the difference between the length of the parallel members 27 and 28 of the parallelogrammatic mechanism 22 and the length of the bending beam of the load cell 23, the following status occurs. That is, as shown exaggeratedly in FIG. 8, the bracket 36 of the parallelogrammatic mechanism 22 exhibits horizontal displacement $\alpha_1$ in the direction to the vertical displacement $\delta_1$. On the other hand, the free end 40 of the load cell 23 exhibits horizontal displacement $\alpha_2$ in addition to the vertical displacement $\delta_1$. These horizontal displacements $\alpha_1$ and $\alpha_2$ are different from each other and this difference results in bending of the connecting rod 24 in the plane of the parallelogrammatic mechanism 22, that is, the paper plane of FIG. 8. If the bending should be transferred to the load cell 23 as it is, the load cell would be subject to interference of forces other than the principal force and reduce its accuracy of measurement. However, the connecting rod 24 has the second flat portion 43 having extremely low bending resistance, and deforms as shown in FIG. 8 to avoid the interference of the bending, thereby transferring only the force in the peripheral direction to the load cell 23. Thus, even if the load is partially applied onto the cradle 34, one or both of the first and second flat portions 41, 42 and 43 of the connecting rod 24 deforms to avoid interference of twist and bending caused by the partial loading, thereby enabling highly accurate measurement.

An experiment was carried out for studying the interference avoiding effect of a weighing device (weighing range of five kilograms) of the abovementioned embodiment. A same weight was put on the cradle 34 of square shape (450 millimeter side length) at positions $W_7$ and $W_8$ apart from the center by 150 millimeters, respectively, towards the front and back and at positions $W_9$ and $W_{11}$ similarly apart from the center by 150 millimeters, respectively, towards the left and right, individually, and differences in the measured values were obtained. The difference between the positions $W_7$ and $W_8$ with respect to the weight value was 1/1,000 before adjustment and 1/10,000 to 1/15,000 after adjustment. In contrast, the corresponding value was 1/200 to 1/400 before and after adjustment in the same experiment except that for the connecting rod 24 was substituted one having no flat portion.

As described above, the weighing device of this invention can effect stable, highly accurate measurement of partial load on the cradle. Moreover, both positive and negative forces or loads can be measured since both ends of the connecting rod 24 are rigidly fixed.

Figure 9:
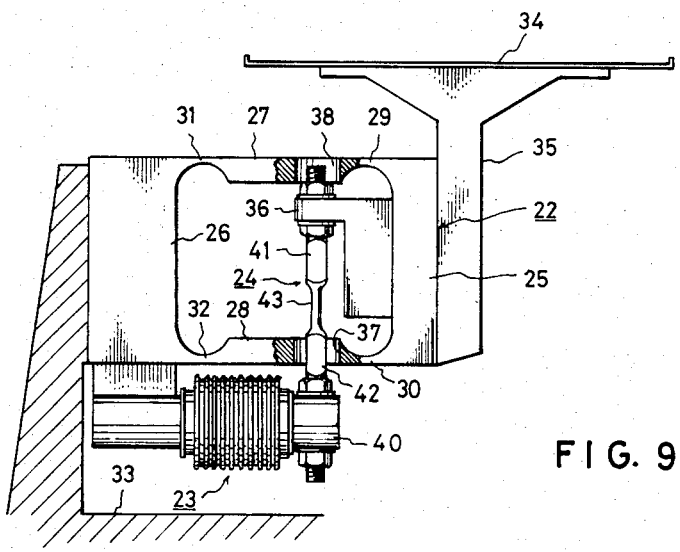
FIG. 9 is a partly sectional side view representing another embodiment of this invention.

FIG. 9 shows a modification of the weighing device of FIG. 5, in which the load cell-parallelogrammatic mechanism structure is positioned upside down and, therefore, compression is applied to the connecting rod 24. The superior operation of the connecting rod 24 is similar to that as described above and will not be described further.

It is considered that the zero point of indication may vary due to temperature change when the structural components have mutually different linear expansion coefficients. For example, if the distance between the bracket 36 and the end portion 40, and the length of the connecting rod 24 itself vary, the zero point will change. Accordingly, in consideration of temperature change, it is desirable to make the main body of the load cell, the parallelogrammatic mechanism, the support arm 39 of the load cell and the connecting rod from materials having same linear expansion coefficient.

Though, in the above-described embodiments, the connecting rod 24 has two first flat portions and one second flat portion, the first and second flat portions may be one or two, respectively. For the metal bellows cover of the load cell 23 may be substituted a urethane or butyl rubber cover having good moisture and gasproofness.

I claim:

1. A weighing device, comprising a parallelogrammatic mechanism having first and second vertical members and first and second horizontal members coupled to form a parallelogram, each of said horizontal members having a pair of elastically deformable portions adjacent its ends, the first vertical member being fixed to a stationary part of said device, the second vertical member carrying a weighing cradle or platform of said device, a cantilever type load cell having one end fixed with respect to said stationary part and another end left free, a connecting rod coupled at one end thereof to said free end of said load cell and at the other end thereof to the second vertical member of the said parallelogrammatic mechanism which carries the weighing cradle; characterized in that said connecting rod is detachably coupled at one end in rigidly fixed fashion to said free end of the load cell and detachably coupled at its other end in rigidly fixed fashion to the second vertical member of the parallelogrammatic mechanism, said connecting rod having no connection to either of said horizontal members of the parallelogrammatic mechanism, said connecting rod including at least one first generally flat portion and at least one second generally flat portion, the flat surface of said first flat portion being generally parallel to the plane of said parallelogram, and the flat surface of said second flat portion being generally perpendicular to said plane.

2. A weighing device, in accordance with claim 1, wherein said load cell is disposed outside of the parallelogram formed by said first and second vertical members and said first and second horizontal members.

3. A weighing device, in accordance with claim 2, wherein said connecting rod is disposed within said parallelogram and extends outwardly with respect thereto through an opening in one of said horizontal members for connection to the free end of said load cell.

4. A weighing device, in accordance with claim 1, further comprising a bracket secured to said second vertical member, said second end of the load cell and said bracket having holes therethrough for receiving the ends of said connecting rod, and nuts threadable on the ends of said connecting rod for detachably coupling the rod in rigidly fixed fashion to the bracket and the load cell.

* * * * *

UNITED STATES PATENT AND TRADEMARK OFFICE
CERTIFICATE OF CORRECTION

PATENT NO. : 4,509,610

DATED : April 9, 1985

INVENTOR(S) : Junichi Hayashi

It is certified that error appears in the above—identified patent and that said Letters Patent is hereby corrected as shown below:

Column 1, line 44, "of for a" should read -- for a --. Column 2, line 40, "load, therefore" should read load cell and, therefore--. Line 53, "as enclosure" should read -- or enclosure --. Column 3, lines 13-14, "unstable pivot contact of" should read -- unstable contact at --. Line 32, "25 and 26" should read -- designated 26 and 25, respectively, --. Column 3, line 32, "a pair of" should read -- first and second --. Line 33, "respectively" should read -- , respectively, --. Lines 62-63, "and is rigidly detachably but" should read -- and is detachably but rigidly --. Line 65, "is rigidly detachably but" should read -- is detachably but rigidly --. Column 4, lines 51-52, "in the direction to the" should read -- in addition to the --. Line 62, "However." should read -- However, --. Line 66, "peripheral" should read -- principal --. Line 68, "34." should read -- 34, --. Column 6, claim 4, line 43, should read "said second end" should read -- said free end --.

Signed and Sealed this

Twenty-fourth Day of December 1985

[SEAL]

Attest:

DONALD J. QUIGG

Attesting Officer

Commissioner of Patents and Trademarks